United States Patent [19]

Koepler et al.

[11] 4,252,012

[45] Feb. 24, 1981

[54] SHOCK ABSORBER SERVICING TOOL

[75] Inventors: Jack L. Koepler, Burbank; Robert L. Hill, Sepulveda, both of Calif.

[73] Assignee: Menasco Inc., Burbank, Calif.

[21] Appl. No.: 45,311

[22] Filed: Jun. 4, 1979

[51] Int. Cl.³ ............................................. G01M 17/04
[52] U.S. Cl. ....................................................... 73/11
[58] Field of Search ......... 73/11; 33/169 B, DIG. 15, 33/180 AT, 181 AT

[56] References Cited

U.S. PATENT DOCUMENTS

| | | | |
|---|---|---|---|
| 1,560,685 | 11/1925 | Gilman | 73/11 |
| 1,737,726 | 12/1929 | Muzyn | 33/DIG. 15 |
| 2,689,408 | 9/1954 | Cornell et al. | 33/169 B |

Primary Examiner—Anthony V. Ciarlante
Attorney, Agent, or Firm—John J. Posta, Jr.

[57] ABSTRACT

A tool to assist in the servicing of a shock absorber wherein the shock absorber is constructed of a pair of aligned gas and liquid filled chambers. Each of the chambers is separated by a movable separator member. Maximum efficiency of the shock absorber is achieved in the locating of a precise volume of gas within the gas chamber and a precise volume of liquid within the liquid chamber. The servicing tool of this invention employs a rod which is to connect with the separator and by observation of the position of the rod with respect to the gauge body, the location of the separator is ascertained even though it is not directly observable.

17 Claims, 8 Drawing Figures

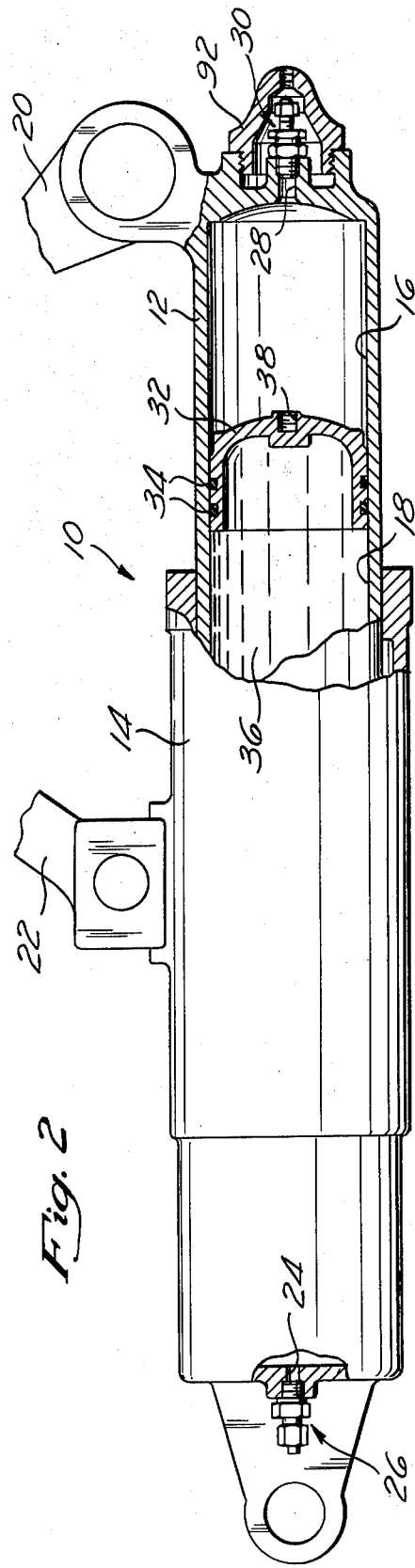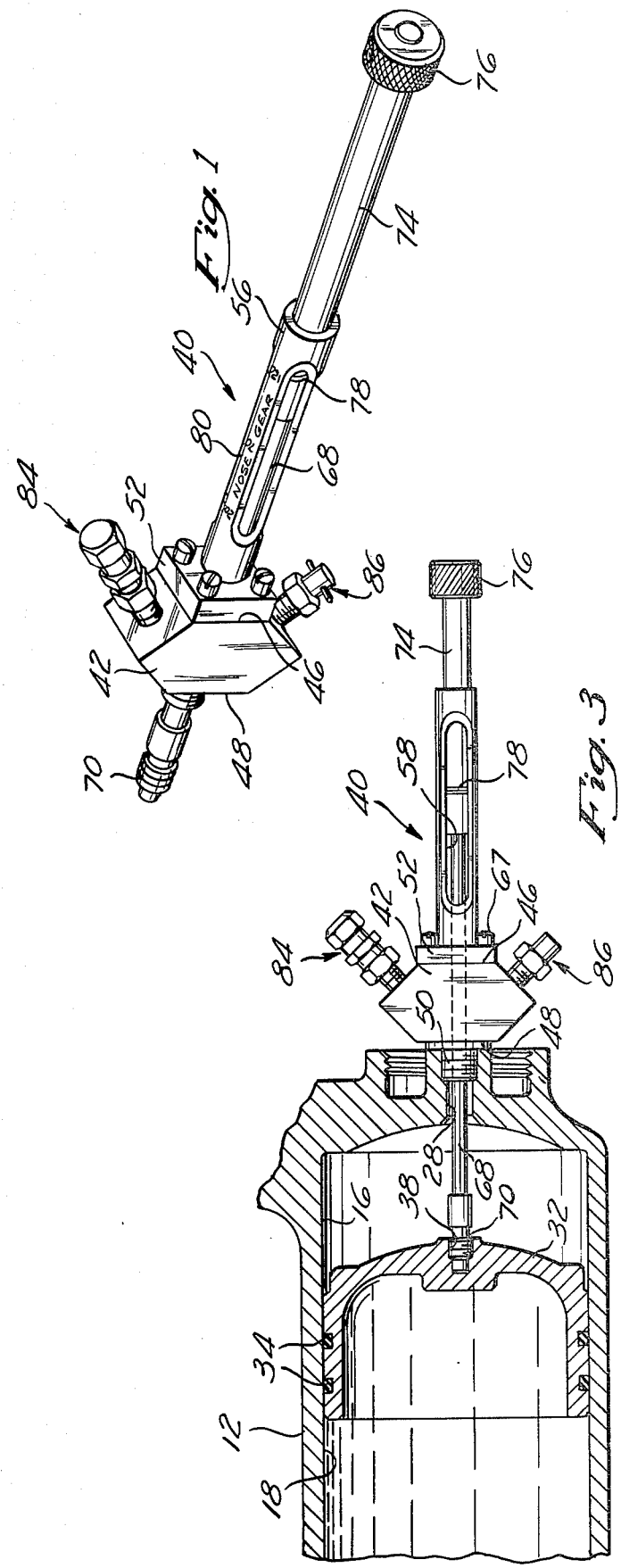

U.S. Patent  Feb. 24, 1981  Sheet 2 of 2  4,252,012
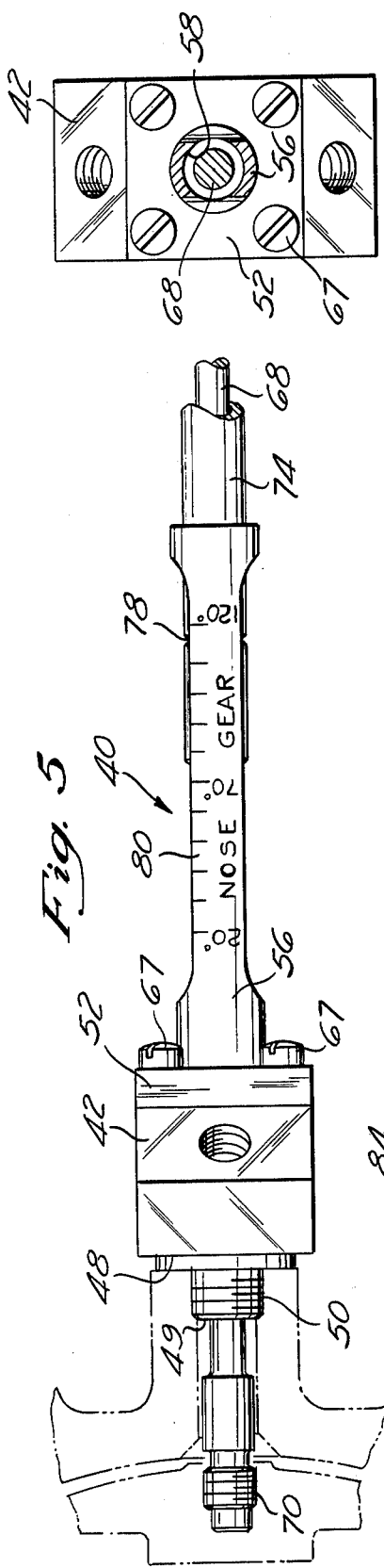
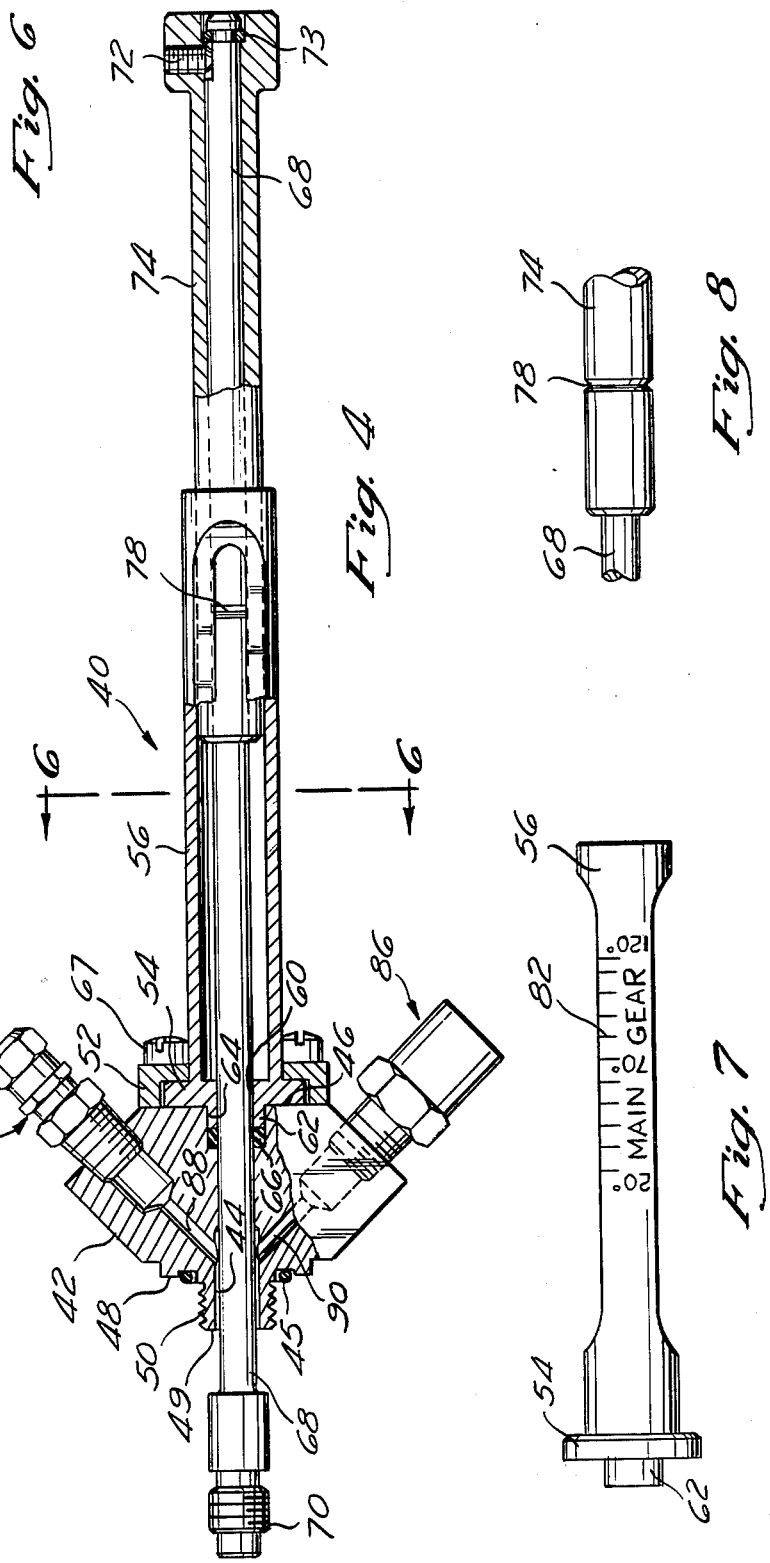
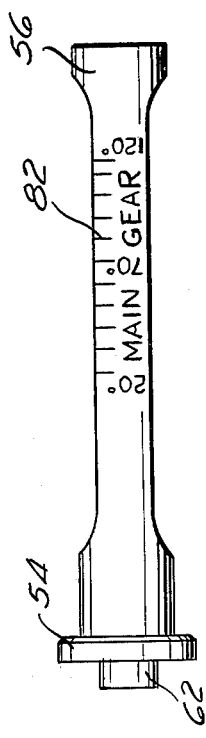

4,252,012

SHOCK ABSORBER SERVICING TOOL

BACKGROUND OF THE INVENTION

The invention described herein was made in the performance of work under NASA Contract No. NAS 9-14000, and is subject to the provisions of Section 305 of the National Aeronautics and Space Act of 1958 (72 STAT. 435; 43 U.S.C. 2457).

In the design of certain aircraft, there is a need for shock absorbers which are capable of absorbing unusually high amounts of energy. In the design of such shock absorbers, there is frequently employed two different shock absorber mediums. Common types of different mediums are a liquid and a gas. A single shock absorber will be divided into a liquid chamber and a gas chamber. The chambers will be separated by a common wall which is termed a separator. This separator is slidingly movable between the chambers.

In order to obtain the most effective energy absorption of the shock absorber, the separator is to be located in a specific position with the liquid chamber containing a certain volume of liquid and the gas chamber containing a certain volume of gas.

If during use of the shock absorber, a small amount of the liquid and/or a small amount of the gas leaks from the shock absorber (which usually occurs), it is not only desirable to replace the liquid and the gas but to make sure that the separator is located in the position that divides the chambers into the precise volumes. This is difficult to do since the wall of the shock absorber does not permit the observing of the separator.

Additionally, the temperature to which the shock absorber is subjected affects the position of the separator. Therefore, the ambient temperatures must be considered during the service of a shock absorber.

SUMMARY OF THE INVENTION

The structure of this invention relates to a tool to facilitate the servicing of a shock absorber which uses both liquid and gas as shock absorbing mediums. The liquid and gas are located in separate chambers which are interconnected through a movable common wall known as a separator. As the pressure builds up within the liquid chamber, the separator is moved into the gas chamber, thereby increasing the pressure of the gas within the gas chamber. Similarly, an increase of pressure within the gas chamber will move the separator into the liquid chamber thereby increasing the pressure within the liquid chamber. The tool of this invention comprises a gauge body which has a longitudinal opening through which an elongated rod is conducted. The inner end of the elongated rod is to be conducted into the gas chamber of the shock absorber and is to attach to the separator. The gauge body is to be fixed to the shock absorber. The outer end of the rod includes an indicator mark the position of which is to be observed in respect to a temperature scale which is fixed in respect to the gauge body. Therefore, by aligning the indicator mark with the known ambient temperature at the time of servicing of the shock absorber, the position of the separator is then known. The position of the separator is established through the locating of the desired volumes of both liquid and gas within the shock absorber. A gas inlet valve is provided within the gauge body as well as a gas relief valve to prevent damage to the tool due to excess gas pressure.

The primary objective of the tool of this invention is to service a liquid/gas shock absorber so that the desired volumes of both the liquid and gas are located within the shock absorber to enable the shock absorber to operate at maximum efficiency.

BRIEF DESCRIPTION OF THE DRAWINGS

FIG. 1 is a perspective view of the tool of this invention prior to connection with a shock absorber;

FIG. 2 is an elevational view, partly-in-cross-section of a conventional liquid/gas shock absorber to which would be attached the tool of FIG. 1 during servicing of the shock absorber;

FIG. 3 is a partly, cross-sectional view through a portion of the shock absorber with the tool of this invention shown connected to the shock absorber;

FIG. 4 is a longitudinal, cross-sectional view of the tool of this invention;

FIG. 5 is a top view of the tool of this invention showing one type of a temperature scale;

FIG. 6 is a cross-sectional view taken along line 6—6 of FIG. 4;

FIG. 7 is an elevational view of a portion of the tool of this invention showing another type of temperature scale; and FIG. 8 is a partial, elevational view of the elongated rod used in conjunction with the tool of this invention showing the indicator mark on the rod.

DETAILED DESCRIPTION OF THE SHOWN EMBODIMENT

Referring particularly to the drawings, in FIG. 2 there is shown a conventional shock absorber 10, which is constructed generally of a front cylinder 12 which is telescopingly received within a second cylinder 14. Within the first cylinder 12 is located a gas chamber 16. Within the second cylinder 14 and also within a portion of the front cylinder 12 is located a liquid chamber 18. The front cylinder 12 is pivotly secured to a torque link 20. The second cylinder is pivotly secured to a torque link 22. Movement is to occur between the links 20 and 22 and this movement is to be damped by means of the shock absorber 10.

Liquid is to be supplied into chamber 18 through liquid fill port 24 which is normally closed by means of plug assembly 26. A gas access opening 28 is normally closed by means of a gas valve assembly 30. Gas valve assembly 30 is threaded into the threaded portion of the opening 28.

Located within the chamber 16 and dividing chambers 16 and 18 is a separator 32. Separator 32 includes seals 34 to prevent leakage of the liquid 36 within the chamber 18 into the gas chamber 16 and also leakage of the gas within the chamber 16 into the liquid chamber 18. The separator 32 includes a threaded opening 38. Opening 38 is located along the longitudinal center axis of the shock absorber 10 and in alignment with the opening 28.

The tool 40 of this invention includes a gauge body 42 which has a longitudinal opening 44 extending from the outer surface 46 of the gauge body 42 to the inner surface 49. Adjacent to inner surface 49 and surrounding a portion of the opening 44 is a threaded boss 50. Adjacent to the threaded boss 50 is a flat seal face 48 that includes seal 45. Rotatably mounted against the outer surface 46 by means of cap 52 is annular flange 54. The flange 54 is integrally formed with a tubular extension 56 which has an interior chamber 58. Extending centrally through the flange 54 is an opening 60. Integrally connected to the flange 54 and located about the opening 60 is a mounting ring 62. The mounting ring 62 is located within seal chamber 64. Located within the chamber 64 is a sealing assembly 66. By tightening of the fasteners 67, thereby securing together the cap 52, the flange 54 and the gauge body 42, the seal assembly 66 is retained forming a gas-tight seal about rod 68. The rod 68 is to be received through the opening in a close fitting manner. The rod 68 also is conducted through the chamber 58 with there being a significant amount of annular space located about the rod 68 and the interior wall of chamber 58. There is to be slight amount of annular space located between the opening 44 and the surface of the rod 68.

The inner end of the rod 68 includes external screw threads 70. The outer end of the rod 68 is fixedly secured by means of a set screw 72 and lock ring 73 to an elongated member 74. The member 74 is telescopingly received within the chamber 58. The outer end of the member 74 is enlarged to form a knob 76. Formed upon the exterior surface of the member 74 and located within the chamber 48 is an indicator mark 78.

Referring particularly to FIG. 5, there is shown first indicia 80 in the form of a calibrated temperature scale comprising a series of spaced marks representing a temperature scale of between 20 degrees to 120 degrees for a "nose gear". Similarly, on the opposite side of the extension 56 there is second indicia 82 comprising a temperature scale of identical limits for a "Main Gear". It is to be noted that the spacing of the marks within the indicia 82 is different from the spacing between the marks of the indicia 80.

Fixedly mounted within the gauge body 42 is a gas inlet valve assembly 84. Also fixedly mounted within the gauge body 42 is a relief valve assembly 86. Construction of the valves 84 and 86 is deemed to be conventional and forms no specific part of this invention. The valve 84 will include a movable core (not shown) which is to be moved within the valve assembly 84 to permit either entry of gas through the valve assembly 84 and into the passage 88 or discharge of the gas from the chamber 16 to the ambient. The gas from the passage 88 is conducted into the opening 44 about the rod 68 and into the chamber 16. If the pressure within the chamber 16 exceeds a predetermined level, that pressure is relieved by conducting of gas through passage 90 and into the ambient through the relief valve assembly 86.

In order to operate the tool 40 of this invention, the shock absorber 10 is to be positioned to a vertical position and to a pre-determined relationship between cylinder 12 and cylinder 14, and the plug assembly 26 removed or placed in the "open" position. The opening 24 is then connected to a source of liquid such as oil.

The cap 92 is removed and the plug assembly 30 also removed. The threads 50 are threadingly secured within a portion of the opening 28 and the rod 68 is extended into the chamber 16 with the threaded end 70 secured within the opening 38 of the separator 32. The slotted tubular extension 56 may be rotated with respect to body 42 for ease of observation. The ambient temperature representing the stabilized liquid temperature is recorded by use of a thermometer (not shown). If the shock absorber 10 was mounted on the nose gear of an aircraft, then the position of the indicator mark in respect to the indicia 80 is noted. If the mark 78 does not align itself with the position of the indicia 80, which represents the temperature of the liquid in chamber 18, then the separator 32 must be moved to align the mark 78 with the indicia 80. The positioning of the separator 32 is accomplished by either adding or discharging gas or liquid from chambers 16 and 18, respectively. The separator 32 may be moved inward (decreases the volume of liquid in chamber 18 and increases the volume of gas in chamber 16) by applying gas pressure at the gas inlet valve assembly 84 on the gauge body 42 while allowing liquid to discharge through the liquid fill port 24. The separator 32 may be moved outward (to the right) by applying pressure through the liquid fill port 24 while allowing gas to discharge through the relief valve assembly 86 in the gauge body 42 or through the gas valve assembly 84 with the movable core held in the "open" position.

Once the separator 32 is properly positioned, the liquid supply tube is disconnected from the opening 24 and the plug assembly 26 is reinstalled or placed in the "closed" position. The gas pressure is then bled from chamber 16 through gas inlet valve 84 and tool 40 is removed from the opening 28. The gas valve plug assembly 30 is then repositioned to close the chamber 16, and the chamber 16 is then recharged to the established pressure. The shock absorber 10 has now been serviced to operate at maximum efficiency.

It is to be noted that if the shock absorber 10 was mounted on the main gear of the aircraft, the indicia 82 would be employed rather than the indicia 80.

What is claimed is:

1. A tool to assist in the servicing of a shock absorber having separate, aligned gas and liquid filled chambers and having a movable separator forming a common wall between the gas and liquid filled chambers, said tool comprising:

a gauge body having a longitudinal opening therethrough extending from one end of said gauge body to the opposite end of said gauge body, said opposite end of the gauge body including connecting means;

a rod extending through said opening in a gas-tight manner, said rod being slideable in respect to said gauge body, a first portion of said rod extends exteriorly of said inner surface with a second portion of said rod extending exteriorly of said outer surface, said first portion including attaching means;

indicator means connected to said second portion, said indicator means to be observable to denote the position of said rod in respect to said gauge body; and a gas valve assembly attached to said gauge body, said gas valve assembly to conduct gas about said first portion of said rod.

2. In combination with the shock absorber, said shock absorber having an aligned pair of gas and liquid filled chambers maintained separate by means of a movable separator, said separator having a first connecting means, said shock absorber having a first access opening for providing access into said gas chamber and a second access opening providing access into said liquid chamber, a tool to facilitate servicing of said shock absorber comprising:

said tool having a gauge body having a longitudinal opening therethrough extending from one end of said gauge body to the opposite end of said gauge body, said opposite end of said gauge body including connecting means, said connecting means adapted to be connected to said first access opening to connect in a gas-tight manner said gauge body to said shock absorber;

a rod extending through said longitudinal opening in a gas-tight manner, said rod being slideable in respect to said gauge body, a first portion of said rod extending exteriorly of said inner surface with a second portion extending exteriorly of said outer surface, said first portion including attaching means, said attaching means adapted to be connected to said connecting means of said separator;

indicator means connected to said second portion of said rod, said indicator means being observeable to denote the position of said rod in respect to said gauge body, said observation to thereby determine the position of said separator in relation to said chambers, thereby to have both of the chambers containing the desired volume of fluid to have the shock absorber operate at maximum efficiency.

3. The combination defined in claim 2 including;

an elongated tubular extension mounted on said gauge body, said second portion of said rod extending through said extension, a portion of the sidewall of said extension being removed to facilitate observation of said indicator means.

4. The combination defined in claim 3 wherein:

indicia adapted located on said extension, said indicia to be read in conjunction with the location of said indicator means.

5. The combination defined in claim 4 wherein:

said indicia comprises a plurality of different types of indicia each of which is to be used separately depending upon the type of shock absorber that is being serviced.

6. The combination as defined in claim 2 wherein:

said connecting means comprises a series of screw threads facilitating connection to a shock absorber, said attaching means comprising a second series of screw threads, said second series of screw threads enabling attachment to said separator of said shock absorber.

7. The combination as defined in claim 2 including:

a gas valve assembly attached to said gauge body, said gas valve enabling conduction of gas about said first portion of said rod.

8. A tool for servicing a shock absorber having two chambers therein separated by a moveable separator, said tool comprising:

a gauge body having a longitudinally extending opening therein;

connecting means on said gauge body for securing the gauge body to one end of said shock absorber;

a rod extending through said opening;

sealing means disposed between said rod and the gauge body to effect a gas-tight seal therebetween;

indicator means secured to said gauge body;

indicia means on said rod adapted to coact with said indicator means to present an observable reading; and said rod being adapted to contact said separator and concurrently provide an indication of the position of said separator within said shock absorber by observing the indicator means located exteriorly of said shock absorber.

9. The tool of claim 8 wherein connection means are provided to secure one end of said rod to the separator.

10. The tool of claim 8 including valve means secured to said gauge body for introducing a fluid medium to one chamber of said shock absorber.

11. The tool of claim 10 wherein said one chamber of the shock absorber is adapted to contain gas and the remaining chamber is adapted to contain fluid.

12. A tool for servicing a shock absorber having longitudinally extending upper and lower chambers separated by a separator which is longitudinally moveable within the shock absorber, said separator having sealing means secured thereto to prevent movement of a medium between the chambers, the upper chamber having fluid therein which is introduced via a fluid valve means located in an opening in one end of the upper chamber, the lower chamber having a gas therein which is introduced via a gas valve means located in an opening in one end of the lower chamber, said tool comprising:

a gauge body having a longitudinally extending opening therein;

an elongated rod extending through said opening;

sealing means disposed between the rod and the gauge body;

connection means on one end of said gauge body for securing the gauge body to said opening in the lower chamber; and indicator means secured to said gauge body to enable an observer to determine the position of said rod with respect to said gauge body.

13. The tool of claim 12 including connection means on one end of said rod for securing the rod to said separator, whereby said indicator enables an observer to determine the position of said separator within the shock absorber.

14. The tool of claim 13 wherein said indicator means includes temperature indicia.

15. The tool of claim 14 wherein said gauge body has a gas valve means incorporated therein for introducing gas into said lower chamber.

16. The tool of claim 15 wherein said gauge body has a gas pressure valve means incorporated therein to relieve gas from said lower chamber.

17. The method of servicing a shock absorber having upper and lower chambers separated by a moveable separator, wherein the upper chamber has a fluid introduction opening therein and the lower chamber has a gas introduction opening therein, comprising:

securing to the opening in the lower chamber a gauge having a rod therein and indicator means for denoting the position of said rod;

securing one end of the rod to the separator;

introducing fluid into the upper chamber and gas into the lower chamber in sufficient amounts so that the indicator shows the separator to be located at a precise predetermined position;

sealing the fluid chamber;

removing the rod from the separator and the gauge from the lower chamber;

introducing gas into the lower chamber at a given pressure level; and sealing the lower chamber.

* * * * *